(12) United States Patent
Ward

(10) Patent No.: US 10,570,770 B2
(45) Date of Patent: Feb. 25, 2020

(54) VARIABLE VANE POSITIONING APPARATUS FOR A GAS TURBINE ENGINE

(71) Applicant: United Technologies Corporation, Farmington, CT (US)

(72) Inventor: Eric J. Ward, West Palm Beach, FL (US)

(73) Assignee: United Technologies Corporation, Farmington, CT (US)

(*) Notice: Subject to any disclaimer, the term of this patent is extended or adjusted under 35 U.S.C. 154(b) by 793 days.

(21) Appl. No.: 15/103,676

(22) PCT Filed: Dec. 8, 2014

(86) PCT No.: PCT/US2014/068988
§ 371 (c)(1),
(2) Date: Jun. 10, 2016

(87) PCT Pub. No.: WO2015/088936
PCT Pub. Date: Jun. 18, 2015

(65) Prior Publication Data
US 2016/0319693 A1    Nov. 3, 2016

Related U.S. Application Data

(60) Provisional application No. 61/914,418, filed on Dec. 11, 2013.

(51) Int. Cl.
*F01D 17/16* (2006.01)
*F04D 29/56* (2006.01)
*F02C 3/04* (2006.01)

(52) U.S. Cl.
CPC .............. *F01D 17/162* (2013.01); *F02C 3/04* (2013.01); *F04D 29/563* (2013.01); *F05D 2260/57* (2013.01); *F05D 2270/58* (2013.01)

(58) Field of Classification Search
CPC .. F01D 17/162; F04D 29/563; F05D 2260/57; F05D 2270/58
(Continued)

(56) References Cited

U.S. PATENT DOCUMENTS 2,933,234 A * 4/1960 Gerhard Neumann ..................... F01D 17/162
415/149.4
3,841,788 A * 10/1974 Sljusarev .............. F01D 17/162
415/147

(Continued)

FOREIGN PATENT DOCUMENTS

| EP | 0381399 | 8/1990 |
| EP | 0961010 | 12/1999 |

(Continued)

OTHER PUBLICATIONS

English machine translation of JP 58-62,303, Jan. 21, 2019.*
(Continued)

*Primary Examiner* — Christopher Verdier
(74) *Attorney, Agent, or Firm* — Carlson, Gaskey & Olds, P.C.

(57) ABSTRACT

A variable vane assembly for a gas turbine engine includes at least one synchronization ring, a plurality of variable vanes connected to the synchronization ring, a plurality of torque boxes disposed circumferentially about the synchronization ring, a drive ring coupled to each of the torque boxes such that the drive ring causes an approximately identical torque to be applied to the synchronization ring from the torque boxes simultaneously, and an actuator coupled to one of the plurality of torque boxes and operable to drive the drive ring through the torque box.

9 Claims, 4 Drawing Sheets

(58) Field of Classification Search
USPC .................... 415/149.2, 149.4, 159–162
See application file for complete search history.

(56) References Cited

U.S. PATENT DOCUMENTS

| | | | |
|---|---|---|---|
| 4,373,859 A | 2/1983 | Thebert | |
| 4,947,070 A * | 8/1990 | Hill | B64C 13/46 |
| | | | 310/80 |
| 5,485,958 A | 1/1996 | Nightingale | |
| 5,910,692 A * | 6/1999 | Saeda | F16H 25/20 |
| | | | 310/13 |
| 6,413,043 B1 | 7/2002 | Bouyer | |
| 6,688,846 B2 | 2/2004 | Caubet et al. | |
| 6,799,995 B2 | 10/2004 | Hsu et al. | |
| 7,104,754 B2 | 9/2006 | Willshee et al. | |
| 7,322,790 B2 * | 1/2008 | Bouru | F01D 17/162 |
| | | | 415/162 |
| 7,588,415 B2 | 9/2009 | Giaimo et al. | |
| 7,901,178 B2 | 3/2011 | Giaimo et al. | |
| 8,113,768 B2 | 2/2012 | Somanath et al. | |
| 8,434,265 B1 | 5/2013 | Campbell et al. | |
| 2009/0226305 A1 * | 9/2009 | Wong | F01D 17/162 |
| | | | 415/160 |
| 2011/0182715 A1 | 7/2011 | Leithead et al. | |
| 2012/0195755 A1 * | 8/2012 | Gasmen | F01D 17/162 |
| | | | 415/230 |
| 2012/0251297 A1 | 10/2012 | Major et al. | |
| 2012/0251306 A1 | 10/2012 | Reinhardt et al. | |
| 2013/0287550 A1 | 10/2013 | Rittenhouse et al. | |

FOREIGN PATENT DOCUMENTS

| | | |
|---|---|---|
| EP | 1256698 | 11/2002 |
| JP | S5862303 | 4/1983 |

OTHER PUBLICATIONS

International Search Report and Written Opinion for PCT Application No. PCT/US2014/068988 dated Jun. 18, 2015.
Supplementary European Search Report for Application No. 14870105.5 dated Nov. 9, 2017.
International Preliminary Report on Patentability for Application No. PCT/US2014/068988 dated Jun. 23, 2016.

* cited by examiner

VARIABLE VANE POSITIONING APPARATUS FOR A GAS TURBINE ENGINE

CROSS-REFERENCE TO RELATED APPLICATION

This application claims priority to U.S. Provisional Application No. 61/914,418 filed on Dec. 11, 2013.

STATEMENT REGARDING GOVERNMENT SUPPORT

This invention was made with government support under Contract No. FA-8650-09-D-0021-D0A1 awarded by the United States Air Force. The Government has certain rights in this invention.

BACKGROUND

The present disclosure relates generally to variable vane systems for a gas turbine engine, and more particularly to a system for positioning variable vanes within a gas turbine engine.

Gas turbine engines include a compressor section, a combustor, and a turbine section that operate in conjunction with each other to generate thrust. The compressor section, the combustor, and the turbine section are connected via a primary flowpath passing through each section. Disposed within the primary flowpath are multiple stators and rotors that affect the airflow through the primary flowpath, and aid in the proper functioning of the combustor section and the turbine section. In some examples, other features of the gas turbine engine result in undesirable flow characteristics.

In order to correct the undesirable flow characteristics, gas turbine engines typically include variable vanes positioned within the primary flowpath to alter the airflow. In some examples, the vanes can be repositioned or reoriented depending on the particular operating state of the gas turbine engine, or other airflow characteristics of the air flowing through the primary flowpath. Vanes of this type are referred to as variable vanes. The variable vanes are connected to a synchronization ring that synchronizes the reorientation of all the vanes connected to the ring. Some existing gas turbine engines include more than one synchronization ring, with some variable vanes connected to each of the synchronization rings.

In some existing systems, the orientation of the variable vanes is controlled by a single actuator that may be located outside of an engine casing. The actuator rotates the synchronization ring, and the rotation of the synchronization ring is transferred to all of the connected variable vanes simultaneously. As a result of natural spring constants in the synchronization ring, deflection occurs in the synchronization ring, and the orientation adjustment of all the vanes due to the rotation is not identical. In particular, the farther a vane is from the actuator, the more the vane is skewed from the desired orientation due to deflection.

In order to reduce the deflection, some systems incorporate additional actuators, offset from the first actuator. The additional actuators are also connected to the synchronization ring and are controlled by the first actuator. During operation, the additional actuators are slave actuators to the first actuator and impart the same motions onto the synchronization ring as the first actuator. The additional actuators are also positioned outside of the engine case, and includes a component protruding through the engine case resulting in additional protrusions through the engine case. The additional protrusions are particularly detrimental in engine designs having multiple concentric cases as a single protrusion penetrates each of the concentric cases. Furthermore, in certain examples, the additional actuators are positioned in inaccessible areas of the gas turbine engine.

SUMMARY OF THE INVENTION

A gas turbine engine according to an exemplary embodiment of this disclosure, among other things includes a compressor section, a combustor fluidly coupled to the compressor section via a primary flowpath, a turbine section fluidly coupled to the combustor section via the primary flowpath, a variable vane assembly including, at least one synchronization ring disposed about the primary flowpath in one of the compressor section and the turbine section, a plurality of variable vanes mounted to the at least one synchronization ring, a drive ring disposed about the primary flowpath in one of the compressor section and the turbine section, a first torque box coupled to the at least one synchronization ring and coupled to the drive ring, such that rotation of a torque box input causes rotation of the at least one synchronization ring and the drive ring, at least one second torque box coupled to the at least one synchronization ring and coupled to the drive ring, such that rotation of the drive ring causes rotation of an input of the at least one second torque box and rotation of the input of the at least one second torque box causes rotation of the synchronization ring, and an actuator including an output, the output is coupled to the input of the first torque box such that the actuator drives the input of the first torque box.

In a further embodiment of the foregoing gas turbine engine, the at least one second torque box is a single torque box, and the first torque box and the single second torque box are offset about the drive ring by 180 degrees.

In a further embodiment of the foregoing gas turbine engine, the at least one second torque box is a plurality of second torque boxes, and the first torque box and the plurality of second torque boxes are distributed evenly about the drive ring.

In a further embodiment of the foregoing gas turbine engine, the actuator output is coupled to the input of the first torque box via a torque tube.

In a further embodiment of the foregoing gas turbine engine, the input of each of the first torque box and the at least one second torque box is coupled to the at least one synchronization ring via a bell crank.

In a further embodiment of the foregoing gas turbine engine, the variable vane assembly is characterized by a single actuator.

In a further embodiment of the foregoing gas turbine engine, the drive ring is supported about the primary flowpath via a plurality of support arms.

In a further embodiment of the foregoing gas turbine engine, the plurality of support arms includes eight support arms, and the eight support arms are distributed approximately circumferentially evenly about the drive ring.

In a further embodiment of the foregoing gas turbine engine, the drive ring is supported about the primary flowpath via a plurality of roller bearings.

In a further embodiment of the foregoing gas turbine engine, the first torque box and the at least one second torque box are interchangeable components.

A method for synchronizing variable vane positioning on a synchronization ring according to an exemplary embodiment of this disclosure, among other things includes receiving a rotational input from an actuator coupled to a first torque box, translating the rotational input from the first torque box to at least a second torque box via a drive ring, and rotating a synchronization ring using the first torque box and the at least one second torque box, thereby minimizing deflection of the synchronization ring.

In a further embodiment of the foregoing method, the method is characterized by the utilization of a single actuator.

In a further embodiment of the foregoing method, translating the rotational input from the first torque box to at least a second torque box via a drive ring further includes driving at least two second torque boxes simultaneously.

A further embodiment of the foregoing method, further includes supporting the drive ring within a turbine engine using a plurality of support arms.

A further embodiment of the foregoing method, further includes supporting the drive ring within a turbine engine using at least one of a roller and a bumper.

A variable vane assembly according to an exemplary embodiment of this disclosure, among other things includes at least one synchronization ring, a plurality of variable vanes coupled to the synchronization ring, a plurality of torque boxes disposed circumferentially about the synchronization ring, a drive ring coupled to each of the torque boxes such that the drive ring causes an approximately identical torque to be applied to the synchronization ring from the torque boxes simultaneously, and an actuator coupled to one of the plurality of torque boxes and operable to drive the drive ring through the torque box.

A further embodiment of the foregoing variable vane assembly, includes a plurality of idler support arms coupled to and disposed about the drive ring.

A further embodiment of the foregoing variable vane assembly, includes a plurality of roller supports disposed about the drive ring.

The foregoing features and elements may be combined in any combination without exclusivity, unless expressly indicated otherwise.

These and other features of the present invention can be best understood from the following specification and drawings, the following of which is a brief description.

DETAILED DESCRIPTION OF AN EMBODIMENT

Figure 1:
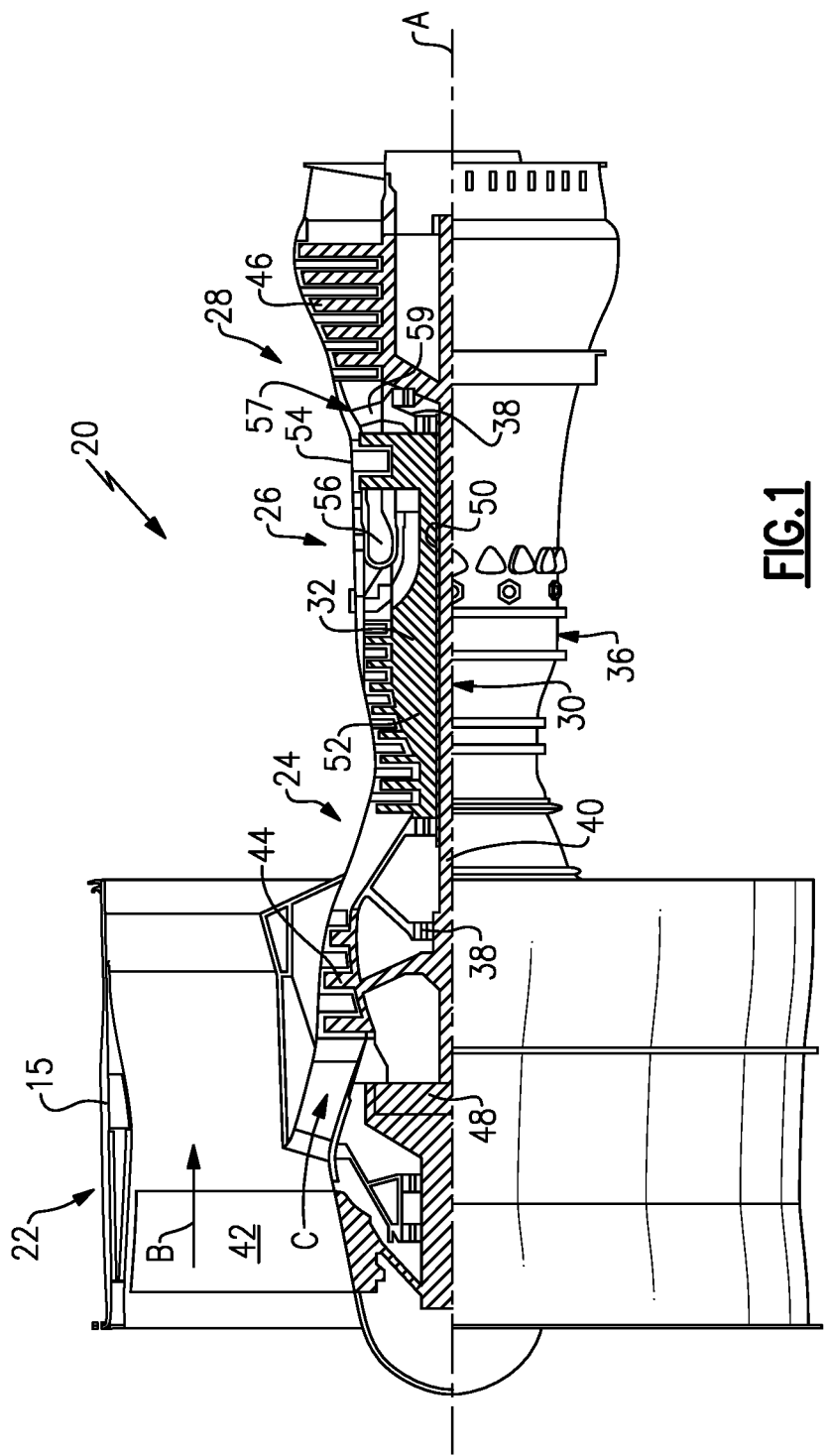
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7 °R)]0.5. The "Low corrected fan tip speed" as disclosed herein according to one non-limiting embodiment is less than about 1150 ft/second.

Also included in at least one of the fan section 22, the compressor section 24 and the turbine section 26 are multiple variable vanes. The variable vanes are positioned on a sync ring and the orientation of the variable vanes is controlled by an actuator system.

Figure 2:
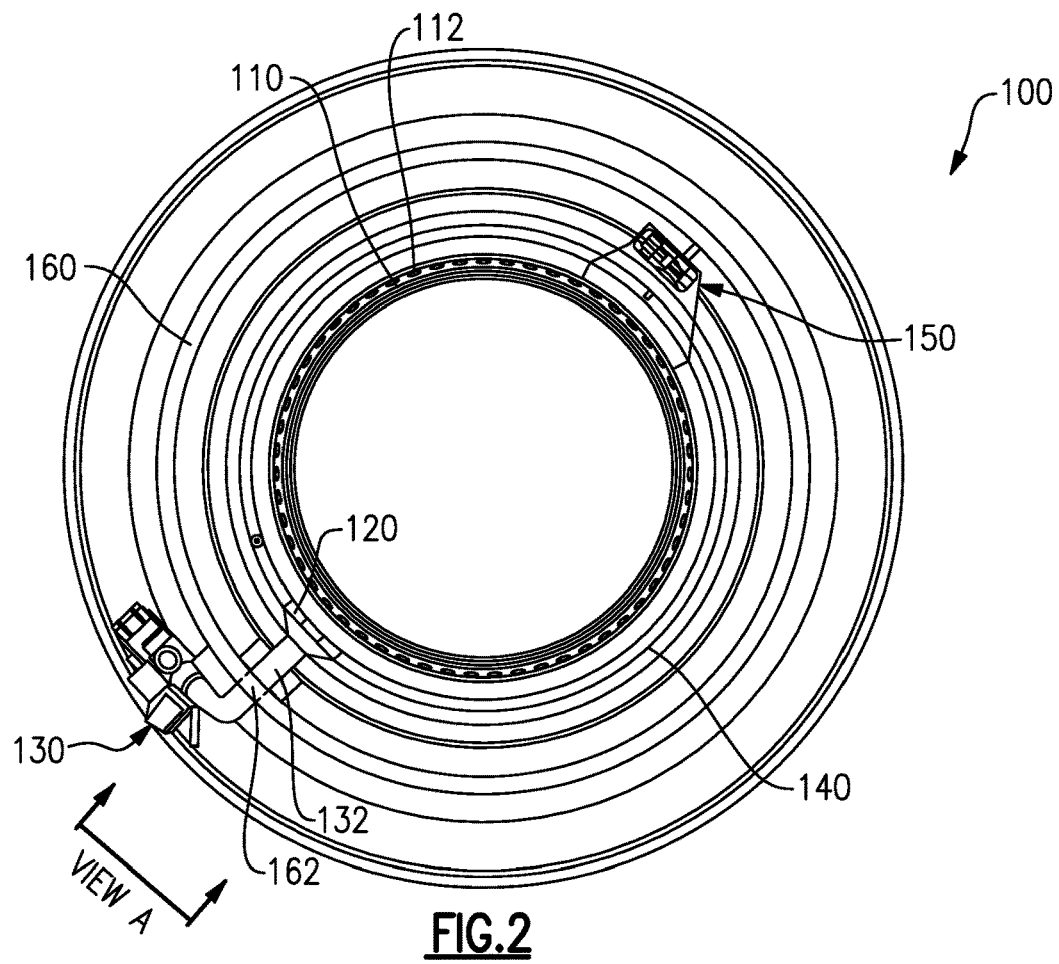
FIG. 2 schematically illustrates an axial view of a variable vane portion of a gas turbine engine.

FIG. 2 schematically illustrates an axial view of a vane portion 100 of the gas turbine engine 20. Multiple vanes 112 are disposed circumferentially about a sync ring 110. A torque box 120 connects the sync ring 110 to an actuator 130 positioned outside an engine case 160 via a torque tube 132. The torque tube 132 protrudes through the engine case 160 at a penetration point 162. The torque tube 132 transfers rotational motion from an actuator output to a torque box 120 input. The torque box 120 then transfers the motion from the input to the sync ring 110. The rotation of the sync ring 110 adjusts the orientation of all the variable vanes 112 connected to the sync ring 110 simultaneously and by the same amount. If only a single torque box 120 is included, the sync ring 110 experiences substantial deflection, causing the motion transfer to the variable vanes 112 to vary.

In order to minimize the deflection, a second torque box 150 is connected to the sync ring 110 and is offset from the first torque box 120 by approximately 180 degrees. The second torque box 150 imparts the same motion on the sync ring 110 as the first torque box 120, simultaneously with the first torque box 120. By imparting the same motion on the sync ring 110 from multiple distributed locations, the deflection in the sync ring 110 is reduced.

The outputs of the first torque box 120 and the second torque box 150 are synchronized via a drive ring 140 that connects the torque boxes 120, 150. The output from the actuator 130 is transferred to the second torque box 150 via the drive ring 140, thus allowing a single actuator 130 to drive both torque boxes 120, 150. In some examples, such as the example illustrated in FIG. 3, each torque box 120, 150 is connected to multiple adjacent sync rings 110, and the vanes 112 on each sync ring 110 are controlled by the torque boxes 120, 150. In some examples the torque boxes 120, 150 are identical components. In yet further examples, the torque boxes 120, 150 are mechanically interchangeable despite having insignificant mechanical differences.

Each torque box 120, 150 is connected to the drive ring 140 via a bell crank mechanism. The bell crank mechanism transfers rotation of a torque box input to the connected drive ring 140 and vice versa. The drive ring 140 is a ring that is supported in the gas turbine engine 20 via multiple support arms. The support configuration is described in greater detail below with regards to FIG. 5.

In some examples the second torque box 150 is a duplicate of the first torque box 120 with the exception that the second torque box 150 is not connected to the actuator 130 or a torque tube 132. In alternate examples the second torque box 150 can have a varied construction that does not include connections able to be connected to a torque tube 132.

By driving the sync ring 110 from two locations (the first torque box 120 and the second torque box 150) that are 180 degrees apart, the deflection in the sync ring 110 is reduced. By extension, vane positioning errors resulting from deflection are also significantly reduced. Furthermore, by utilizing a single actuator 130 and a single torque tube 132, the number of engine case 160 penetration points is reduced to a single penetration point 162, further improving airflow through the engine case.

Figure 3:
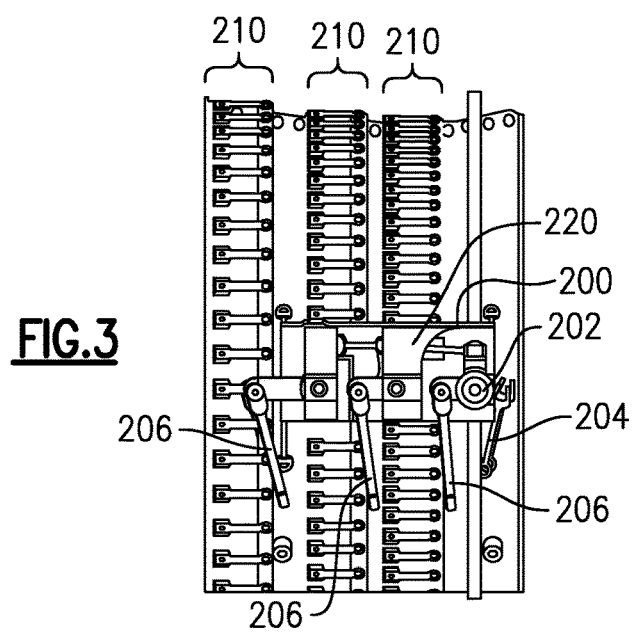
FIG. 3 schematically illustrates a radially inward view of a torque box and synchronization rings of the variable vane portion of FIG. 2.

With continued reference to FIG. 2, and with like numerals indicating like elements, FIG. 3 schematically illustrates a radially inward view of a torque box 200 and sync rings 220 of the vane portion 100 of FIG. 2 along view A. The illustrated torque box 200 includes an input 202 for connecting to a torque tube 132 (illustrated in FIG. 2) and receiving a rotational input from the torque tube 132. The input 202 rotates with rotation of the torque tube 132 and is connected to a drive ring bell crank arm 204 and multiple sync ring bell crank arms 206. When the input 202 is rotated by the connected torque tube 132, the rotation is transferred through the bell crank arms 204, 206 to the connected drive ring 210 or the connected sync rings 220.

If the torque box 200 is not connected to the actuator 130, as is the case with the second torque box 150 of FIG. 2, rotation of the drive ring 210 is transferred to the input 202, and through the input 202 to the sync ring bell crank arms 206. In this way, the second torque box 150 and the first torque box 120 apply approximately identical torques to the sync rings 220 simultaneously. The simultaneous application of torque at least partially alleviates the deflection in the sync rings 220 and better positions the variable vanes.

While the example torque box 200 of FIG. 3 utilizes a bell crank connection scheme in a torque box to connect the input 202 to the drive ring 210 and the sync rings 220, one of skill in the art, having the benefit of this disclosure will understand that alternate connection schemes can similarly be used and still fall within the instant disclosure. In some examples, the torque boxes can be replaced with pump handle devices, crankshaft mechanisms, or any similar device. Furthermore, an engine can use any combination of the above described mechanisms. Thus, in it's broadest interpretation the term torque box in the above description and the following claims refers to any mechanism for transferring torque from an input, such as the actuator or the drive ring, to an output, such as the synchronization rings.

Figure 4:
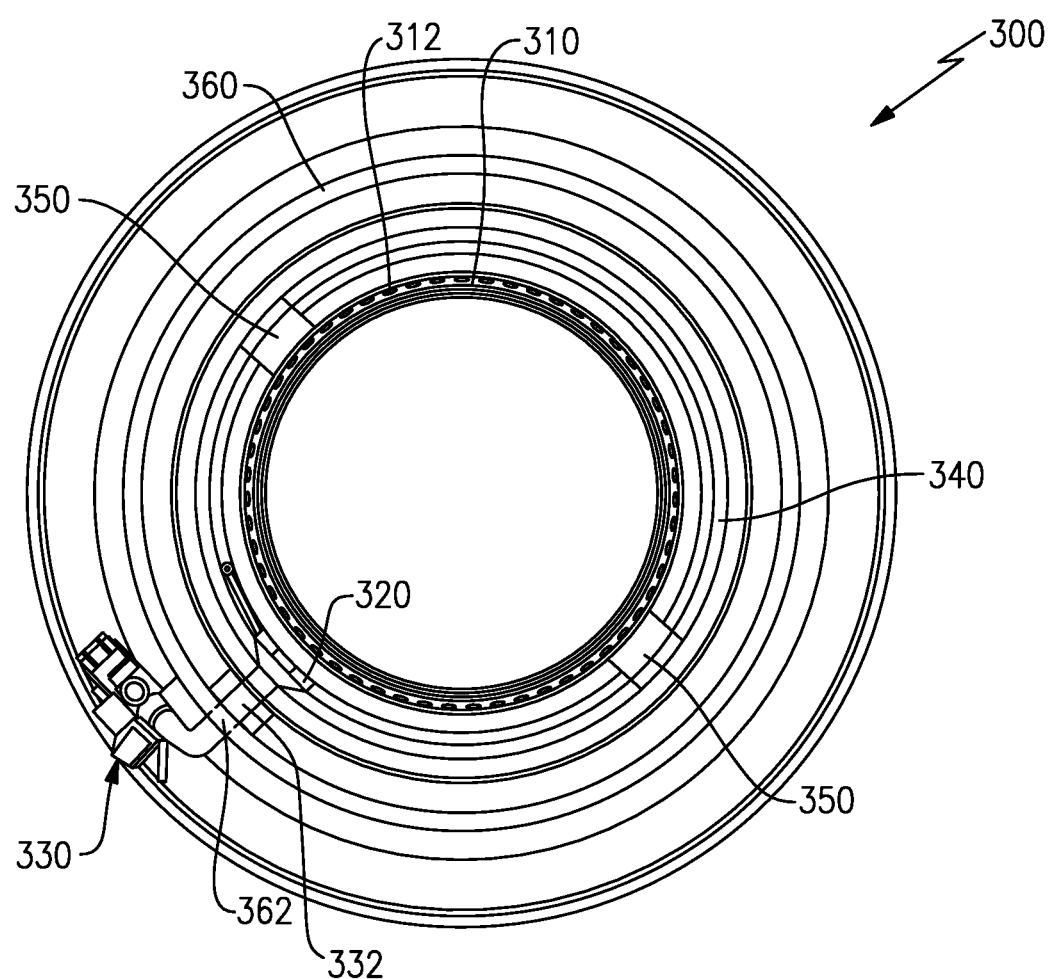
FIG. 4 schematically illustrates an axial view of an alternate variable vane portion of the gas turbine engine.

With continued reference to FIGS. 2 and 3, and with like numerals indicating like elements, FIG. 4 illustrates an axial view of an alternate vane portion of the gas turbine engine. As with the example of FIG. 2, the vane portion 300 of FIG. 4 includes a sync ring 310 supporting multiple variable vanes 312 that are disposed circumferentially about the sync ring 310. An actuator 330 is disposed outside of an engine casing 360 with a torque tube 332 protruding through a penetration point 362 and connecting an output of the actuator 330 to a torque box 320.

The torque box 320 is connected to a drive ring 340 via a bellcrank mechanism. Unlike the example of FIG. 3, however, the torque box 320 does not include any connections to the sync ring 310. Instead, two additional torque boxes 350 are disposed approximately 90 degrees offset from the first torque box 320, and 180 degrees offset from each other. Each of the secondary torque boxes 350 are connected to the drive ring 340 and receive an input from the drive ring 340 as described above with regards to the secondary torque box 150 in the example of FIG. 2. By utilizing two secondary torque boxes 350 in this manner, the amount of deflection on the drive ring 340 entering each of the secondary torque boxes 350 is approximately equalized, and the translation of movement from the actuator 330 into the sync rings 310 is further aligned.

While each of the examples of FIGS. 2 and 4 utilize two torque boxes 120, 150, 350 to drive the sync rings 110, 310, one of skill in the art having the benefit of this disclosure will understand that alternate number of torque boxes 120, 150, 350 can be used to drive the sync rings 110, 310 to similar effect. Increasing the number of torque boxes decreases the deflection in the drive ring 140, 340, and thus further aligns the orientation of the variable vanes 112, 312. However, increasing the number of torque boxes increases the weight and complexity of the system.

Furthermore, the benefits of additional torque boxes 120, 150, 350 provide diminishing returns. That is to say, the benefit of adding a third torque box is smaller than the benefit of adding a second torque box, the benefit of adding a fourth torque box is smaller than adding a third torque box, etc. One of skill in the art, having the benefit of this disclosure, can determine an ideal number of torque boxes for a given engine based on the particular needs of the engine.

Figure 5:
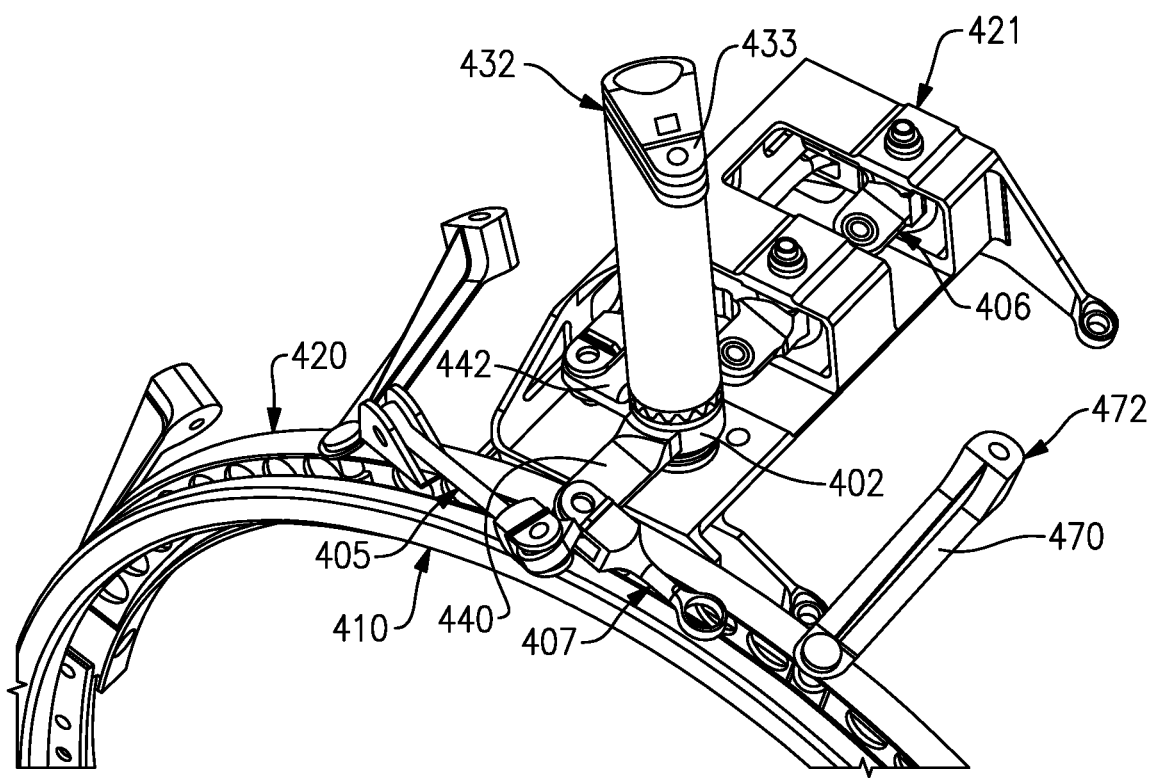
FIG. 5 schematically illustrates torque box and drive ring assembly isolated from a gas turbine engine.

With continued reference to FIGS. 1-4, and with like numerals indicating like elements, FIG. 5 illustrates a torque box 421 and drive ring 420 assembly isolated from the gas turbine engine 20 for explanatory purposes. The torque box 421 includes a rotatable input 402 that is connected to a torque tube 432. In an assembled gas turbine engine 20, the torque tube 432 is connected to an actuator arm via a connection arm 433. The connection arm 433 transfers linear motion of the actuator arm into rotational motion of the torque tube 432.

Rotation of the torque tube 432 is transferred to the input 402, which in turn transfers the rotation of multiple bell crank arms 440, 442. A drive ring bell crank arm 440 connects the input 442 to a linkage 405. The linkage 405 is connected on an opposite end to a drive ring 420. The linkage 405 operates in conjunction with the drive ring bell crank arm 440 to transfer rotation of the input 402 into rotation of the drive ring 420.

Connected to each of the sync ring bell crank arms 442, is a linkage 407 (only illustrated for the illustrated Sync ring 410) that connects the bell crank arm to the Sync ring 410. As with the drive ring, rotation of the input 402 is transferred to rotation in the attached Sync ring 410 through the bell crank arms 442 and the linkage 407.

The drive ring 420 is supported in position within the gas turbine engine 20, via multiple idler support arms 470. The support arms 470 are conventional support arms and allow the drive ring 420 to be rotated about an axis defined by the gas turbine engine 20. In some examples, the drive ring 420 is supported by eight support arms 470 spaced approximately evenly about the circumference of the drive ring 420. In alternate examples, the drive ring 420 is supported by rollers, bumpers, or other support means that are distributed circumferentially about the drive ring 420.

In either support archetype, the drive ring 420 is structurally supported by the gas turbine engine case in a manner that allows for the drive ring 420 to rotate about the axis of the gas turbine engine. As described above, additional torque boxes 410 are connected to the drive ring in the illustrated manner, with only a single torque box being connected to an actuator via a torque tube 432. Each of the secondary torque boxes includes an input 402 connected to the drive ring 420 and the input 402 is driven by the drive ring 420.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a compressor section;
    a combustor fluidly coupled to the compressor section via a primary flowpath;
    a turbine section fluidly coupled to the combustor section via the primary flowpath;
    a variable vane assembly comprising;
        at least one synchronization ring disposed about said primary flowpath in one of said compressor section and said turbine section;
        a plurality of variable vanes mounted to said at least one synchronization ring;
        a drive ring disposed about said primary flowpath in one of said compressor section and said turbine section;
        a first torque box coupled to said at least one synchronization ring and coupled to said drive ring, such that rotation of a torque box input causes rotation of the at least one synchronization ring and the drive ring;
        a single second torque box offset from the first torque box about said drive ring by 180 degrees, the single second torque box being coupled to said at least one synchronization ring and coupled to said drive ring, such that rotation of the drive ring causes rotation of an input of the single second torque box and rotation of the input of the single second torque box causes rotation of the synchronization ring; and
        an actuator including an output, wherein the output is coupled to the input of the first torque box such that the actuator drives the input of the first torque box.

2. The gas turbine engine of claim 1, wherein the actuator output is coupled to the input of the first torque box via a torque tube.

3. The gas turbine engine of claim 1, wherein the input of each of said first torque box and said single second torque box is coupled to the at least one synchronization ring via a bell crank.

4. The gas turbine engine of claim 1, wherein the variable vane assembly is characterized by a single actuator.

5. The gas turbine engine of claim 1, wherein the drive ring is supported about the primary flowpath via a plurality of support arms.

6. The gas turbine engine of claim 5, wherein the plurality of support arms comprises eight support arms, and wherein the eight support arms are distributed approximately circumferentially evenly about the drive ring.

7. The gas turbine engine of claim 1, wherein the first torque box and the single second torque box are interchangeable components.

8. A variable vane assembly comprising:
at least one synchronization ring;
a plurality of variable vanes coupled to said synchronization ring;
a plurality of torque boxes disposed circumferentially about the synchronization ring, the plurality of torque boxes including a first torque box coupled to the at least one synchronization ring and a single second torque box;
a drive ring coupled to each of said torque boxes such that said drive ring causes an approximately identical torque to be applied to the synchronization ring from the torque boxes simultaneously;
the single second torque box being offset from the first torque box by 180 degrees about the drive ring; and
an actuator coupled to one of said plurality of torque boxes and operable to drive the drive ring through the torque box.

9. The variable vane assembly of claim 8, further comprising a plurality of idler support arms coupled to and disposed about the drive ring.

* * * * *